(12) United States Patent
Taoda et al.

(10) Patent No.: US 6,180,548 B1
(45) Date of Patent: Jan. 30, 2001

(54) ENVIRONMENT-PURIFYING MATERIAL AND ITS MANUFACTURING METHOD

(75) Inventors: Hiroshi Taoda, 4-301, Inokushijutaku 1-70, Heiwagaoka, Meito-ku, Nagoya-shi, Aichi; Toru Nonami, 1-302, Inokushijutaku 1-70, Heiwagaoka, Meito-ku, Nagoya-shi, Aichi; Fujio Aramaki, Kawasaki; Shoshichi Aramaki, Fujisawa, all of (JP)

(73) Assignees: Agency of Industrial Science and Technology, Tokyo; JME Co., Ltd., Kawasaki; Hiroshi Taoda; Toru Nonami, both of Nagoya, all of (JP)

( * ) Notice: Under 35 U.S.C. 154(b), the term of this patent shall be extended for 0 days.

(21) Appl. No.: 09/132,087

(22) Filed: Aug. 10, 1998

(51) Int. Cl.[7] .................................................. C04B 35/46
(52) U.S. Cl. ........................ 501/137; 501/135; 501/136; 585/260; 588/901
(58) Field of Search .................... 502/309, 414; 106/38.2, 38.22, 20 C; 585/260; 588/901; 501/137, 135, 136

(56) References Cited

U.S. PATENT DOCUMENTS

| | | | |
|---|---|---|---|
| 5,039,546 | * 8/1991 | Chung et al. .......................... 427/2 |
| 5,125,971 | * 6/1992 | Nonami et al. ......................... 106/35 |
| 5,205,921 | * 4/1993 | Shirkanzadeh ....................... 205/318 |
| 5,215,941 | * 6/1993 | Yasukawa ............................... 501/1 |
| 5,449,467 | * 9/1995 | Taoda et al. .......................... 210/748 |
| 5,468,544 | * 11/1995 | Marcolongo et al. ................ 428/224 |
| 5,562,820 | * 10/1996 | Taoda et al. ........................... 210/94 |
| 5,612,049 | * 3/1997 | Li et al. ................................ 424/422 |
| 5,645,934 | * 7/1997 | Marcolongo et al. ............... 428/357 |
| 5,707,915 | * 1/1998 | Taoda ................................... 502/159 |
| 5,766,669 | * 6/1998 | Pugh et al. .......................... 427/2.27 |
| 5,849,569 | * 12/1998 | Davies ............................... 435/288.3 |
| 5,853,866 | * 12/1998 | Watanabe et al. ................. 428/312.8 |
| 5,872,072 | * 2/1999 | Mouri et al. ......................... 502/208 |

OTHER PUBLICATIONS

Itatani et al. Formation of porous calcium phosphate film on titanium oxide substrate by spray–pyrolysis technique. Gypsum Lime, 238, 168–76 (Chinese). 118:65376, 1992.*

Wen et al. Preparation of calcium phosphate coatings on titanium implant materials by simple chemistry. 227–236 (English). 129:85971, 1998.*

* cited by examiner

*Primary Examiner*—Tom Dunn
*Assistant Examiner*—Cam N. Nguyen
(74) *Attorney, Agent, or Firm*—Oblon, Spivak, McClelland, Maier & Neustadt, P.C.

(57) ABSTRACT

An environment-purifying material is obtained by immersing a carrier with a titanium oxide film coated on its surface or a substrate comprising titanium oxide particles, in a pseudo-body fluid containing an excessive amount of calcium phosphate, and then coating the surface of the substrate with a porous calcium phosphate film that easily adsorbs toxic substances and that is inactive as a photocatalyst.

22 Claims, No Drawings

ENVIRONMENT-PURIFYING MATERIAL AND ITS MANUFACTURING METHOD

TECHNICAL FIELD

The present invention relates to an environment purifying material and its manufacturing method wherein the material is used to remove offensive odors, to decompose and remove toxic substances or dust in the air, to provide wastewater treatment or water-purifying treatment, or to perform sterilization or algae elimination, or is added to organic fibers or plastics by means of mixing.

PRIOR ART

In recent years, offensive odors in residential or working spaces and contamination caused by toxic substances such as exhaust gas from vehicles have become an incresingly serious problem. Water contamination caused by gray water or industrial wastewater, particularly, the contamination of water sources by organic-chlorine solvents or agricultural chemicals in golf fields is difficult to treat using the current water treatment method under the Activated Sludge Process.

A common conventional method for preventing offensive odors or removing toxic substances in the air is to allow such odors or substances to be absorbed or adsorbed by an acid or alkali absorbent or adsorbent. This method, however, is disadvantageous in the disposal of wastewater or the used adsorbent, and may involve secondary pollution. An aromatic can also be used to conceal the offensive odor, but the odor of the aromatic may soak into and spoil foods (for further information, refer to "Encyclopedia", Heibonsha, Vol. 1, p. 136, K. Nishida, 1984).

When titanium oxide is irradiated with light, electrons having a strong reduction effect and holes having a strong oxidation effect are generated to decompose molecular species that come into contact with them. This effect of titanium oxide, i.e., its photocatalyst effect, can be used to decompose and remove environmental-pollution materials such as organic solvents, agricultural chemicals, and surface-active agents that are dissolved in water as well as toxic substances or offensive odors in the air. This method can be repeated simply by using titanium oxide and light, and its reactive products are nontoxic carbon dioxide. Unlike biological treatments using microorganisms, it is not limited by reaction conditions such as temperature, pH, gas atmosphere, and toxicity, and is advantageous in its ability to decompose and remove organic halides or phosphides that cannot be treated easily using said biological treatments.

Conventional studies of the decomposition and removal of organisms using a titanium oxide photocatalyst used titanium oxide powder as a photocatalyst (for additional information, refer to the following: A. L. Pruden and D. F. Ollis, Journal of Catalysis, Vol. 82, 404 (1983), H. Hidaka, H. Jou, K. Nohara, and J. Zhao, Chemosphere, Vol. 25, 1589 (1992). and T. Hisanaga, K. Herada, and K. Tanaka, Industrial Water, Vol. 379, 12 (1990)).

Thus, this method is difficult to use for a variety of reasons, including the diffculty of collecting used catalysts. Attempts were therefore made to mix the titanium oxide photocatalyst into a medium such as fibers or plastics that are easy to handle. Due to its strong photocatalyst effect, however, the titanium oxide photocatalyst not only decompose toxic organisms or environmental-pollution materials but also decompose and significantly degrade the fibers or plastics, rendering mixture into the fibers or plastics extremely difficult. In addition, if the titanium oxide photocatalyst is used as an antibacterial or a antifungal material, bacteria do not adhere to the photocatalyst appropriately due to flowing water, thereby reducing the effects and efficiency of the treatment.

DISCLOSURE OF THE INVENTION

In view of the above problems, it is an object of this invention to provide an environment-purifying material and its manufacturing method wherein the material can be used to effectively and economically purify environments by removing offensive odors, decomposing and removing toxic substances or dust from the air, providing wastewater or water-purifying treatment, or enabling protection from bacteria or fungi. Even if this material is added to organic fibers or plastics by means of mixing, it does not degrade the medium but can maintain its durability.

As a result of their efforts in achieving this object, the inventors have found that by coating a calcium phosphate film around titanium oxide when the latter is added to a medium, the durability of the titanium oxide can be improved without negatively affecting its photocatalyst function due to the inactivity of the calcium phosphate film as a photocatalyst, its ability to adsorb various bacteria, and its porosity.

This invention provides an environment-purifying material composed of a porous calcium phosphate coated on a surface of a substrate, with the surface consisting of titanium oxide.

According to the environment-purifying material of this invention, the calcium phosphate film covering the surface is porous, so the titanium oxide is exposed from the bottoms of pores, where it is irradiated with light. The oxidation-reduction effect of electrons and holes generated during irradiation with light serves to decompose and remove offensive odors, or organic compounds contaminating environments, including toxic substances in the air and organic solvents or agricultural chemicals dissolved in water.

In addition, due to its inactivity as a photocatalyst, even if the environment-purifying material is added to a medium such as organic fibers or plastics by means of mixing, it is protected by the calcium phosphate film, preventing the fibers or plastics from being decomposed in order to ensure its effects last over a longer period of time.

Furthermore, due to the calcium phosphate film's ability to adsorb various bacteria, various adsorbed bacteria can be reliably and efficiently killed and decomposed by the powerful oxidation effect of the titanium oxide provided when irradiated with light.

In addition, to obtain this environment-purifying material, this invention provides a environment-purifying material manufacturing method characterized in that a substrate having a surface consisting of titanium oxide is immersed in a pseudo-body fluid containing an excessive amount of calcium phosphate compared with real human body fluid in order to coat a porous calcium phosphate film on the surface of the substrate. The concentration of calcium phosphate in the pseudo-body fluid is preferably about 1 to 20 times, or more preferably, 2 to 15 times greater than that in the human body fluid.

A carrier used for this invention includes activated carbon, activated alumina, silica gel, zeolite, clay sintered compacts, glass, foam ceramics, foam metal, and foam plastics, but silica gel or glass are the most preferable materials in terms of light transmissivity. In addition, the carrier preferably contains silicon or titanium.

The carrier used for this invention may have an arbitrary shape, and may be shaped like, for example, particles, a plate, a cylinder, a prism, a cone, a sphere, a gourd, or a rugby ball.

The titanium oxide film can be coated on the surface of the carrier using various methods, including evaporation, PVD, CVD, sputtering, coating of titanium oxide sol using the sol-gel process, and fixation of titanium oxide in very fine particles.

The titanium oxide particles and film used for this invention preferably have an anatase crystal form because it provides high performance as a photocatalyst. The rutile, brookite, or amorphous types are not very preferable due to their low level of photocatalyst activity. In addition, the titanium oxide particles may be of any size, but are preferably of submicron-scale size when mixed into organic fibers or plastics.

The environment-purifying material according to this invention is prepared by immersing in a pseudo body fluid a substrate the surface of which is coated with titanium oxide to generate porous calcium phosphate on the surface.

The pseudo body fluid used for this invention is prepared by dissolving in water NaCl, $NaHCO_3$, KCl, $K_2HPO_4.3H_2O$, $MgCl_2.6H_2O$, $CaCl_2$, and $Na_2SO_4$ or NaF. And pH is preferably adjusted to between 7 and 8, more preferably, 7.4 using HCL or $(CH_2OH)_3CNH_2$.

The preferable composition of the pseudo body fluid used for this invention is shown below.
$Na^+$ 120 to 160 mM
$K^+$ 1 to 20 mM
$Ca^{2+}$ 0.5 to 50 mM
$Mg^{2+}$ 0.5 to 50 mM
$Cl^-$ 80 to 200 mM
$HCO_3^-$ 0.5 to 30 mM
$HPO_4^{2-}$ 1 to 20 mM
$SO_4^{2-}$ 0.1 to 20 mM
$F^-$ 0 to 5 mM If the concentration is higher, creation of calcium phosphate becomes more time consuming, whereas when it is lower, calcium phosphate is rapidly created to hinder porosity or thickness control.

The temperature of the pseudo-body fluid is preferably between 30° C. and 10° C. when the substrate is immersed in the fluid. When the temperature is lower, a greater amount of time is required to generate calcium phosphate, whereas when it is higher, control over the film thickness and porosity is hindered due to the evaporation of the pseudo body fluid. The temperature is most preferably between 50° C. and 80° C.

The time during which the substrate is immersed in the pseudo-body fluid is preferably between one hour and 18 days. When the time is shorter, calcium phosphate is insufficiently generated, whereas when the time is longer, the film thickness becomes excessive.

In addition, according to the environment-purifying material of this invention, when metal such as platinum, rhodium, ruthenium, palladium, silver, copper, or zinc supports the surface of the titanium oxide film, the speed at which chemical substances are oxidized and decomposed increases to improve the sterilization and algae-elimination effects.

According to the environment-purifying material of this invention, the porosity, thickness, and shape of the calcium phostate on its surface can be controlled by varying the composition of the pseudo body fluid, the temperature, or the immersion time. When the content of phosphorous or calcium, the temperature, or the time is reduced, a striped or thin calcium phosphate film is generated on the surface of the substrate. If the content of phosphorous or calcium, or the temperature is increased, the film thickness of calcium phosphate increases.

The surface of the environment-purifying material obtained in this manner is coated with calcium phostate, which is inactive as a photocatalyst, and since apatite hydroxide adsorbs protein, amino acid, bacteria, and viruses, the apatite film on the surface can adsorb bacteria in water or the air. In addition, since the calcium phosphate film has pores on its surface and titanium oxide, which is active as a photocatalyst, is exposed from the bottom of the pores, these exposed portions are irradiated with sunlight or artificial light from fluorescent lights, incandescent lamps, black lights, UV lamps, mercury lamps, xenon lamps, halogen lamps, or metal halide lamps. Due to the oxidization-reduction effect of electrons and holes generated in titanium oxide during irradiation with light, the protein, amino acid, bacteria, and viruses adsorbed by the apatite film can be continuously decomposed and removed promptly.

If the environment-purifying material is mixed into a medium such as organic fibers or plastics, the portion contacting the organic fibers or plastics and consisting of ceramics that are inactive as a photocatalyst adsorbs offensive odors or toxic substances such as NOx in the air, or organic compounds that contaminate environments, including organic solvents or agricultural chemicals that are dissolved in water without causing said organic fibers or plastics to decompose. These substances are then continuously decomposed and removed promptly using the oxidization-reduction effect of electrons and holes generated in titanium oxide during irradiation with sunlight or artificial light from fluorescent lights, incandescent lamps, black lights, UV lamps, mercury lamps, xenon lamps, halogen lamps, or metal halide lamps.

In addition, the present material can be used with light irradiation alone, without the need for high costs or energy or maintenance. If metal such as platinum, rhodium, ruthenium, palladium, silver, copper, or zinc supports the surface of the material as titanium oxide particles, its catalyst effect further increases environment-purifying effects such as an organic-compound decomposition and removal effect or an antibacterial or funginert effect.

The environment-purifying material according to this invention is applicable to all types of organic fibers or plastics, as well as their copolymers, including polyethylene, nylon, polyvinyl chloride, polyvinylidene chloride, polyester, polypropylene, polyehtylene oxide, polyethylene glycol, polyethylene terephthalate, silicon resin, polyvinyl alcohol, vinyl acetal resin, polyacetate, ABS resin, epoxy resin, vinyl acetate resin, cellulose, cellulose derivative, polyamide, polyurethane, polycarbonate, polystyrene, urea resin, fluorine-contained resin, polyvinylidene, phenol resin, celluloid, chitin, and starch sheet.

Embodiments

Particularly representative embodiments of this invention are shown below.

[Embodiment 1]

Water and nitric acid were added to titanium tetraisopropoxide to prepare a transparent titanium oxide sol, and the dip coating method was used to coat the sol on granular alumina approximately 1 cm in diameter that was used as a carrier, followed by firing at 550° C. The coating and firing steps were repeated three times to obtain a substrate with its surface coated with a titanium oxide film.

On the other hand, as a pseudo body fluid, an aqueous solution of pH 7.4 composed of 147 mM of $Na^+$, 5 mM of $K^+$, 2.5 mM of $Ca^{2+}$, 1.5 mM of $Mg^{2+}$, 147 mM of $Cl^-$, 4.2 mM of $HCO_3^-$, 1.0 mM of $HPO_4^{2-}$, and 0.5 mM of $SO_4^{2-}$ was prepared using NaCl, $NaHCO_3$, KCl, $K_2HPO_4.3H_2O$, $MgCl_2.6H_2O$, $CaCl_2$, $Na_2SO_4$, HCl, $(CH_2OH)_3CNH_2$, and distilled water. The substrate was placed in this aqueous solution and left at 50° C. for 14 days to form the environment—purifying material.

The environment-purifying material obtained was then observed under an analytical electron microscope, and it was determined that the surface of the material was covered with porous apatite hydroxide. 20 environment-purifying materials were placed in a vase with water and left under a fluorescent lamp for two months. The surface of the materials did not become slippery and no bacteria or algae were found thereon.

On the contrary, without the environment-purifying material, algae began growing on the surface, rendering it extremely slippery within one week.

[Embodiment 2]

Isopropanol and diethanolamine were added to titanium tetraisopropoxide to prepare a transparent sol liquid, and the dip coating method was used to coat the liquid on a carrier of silica beads approximately 5 mm in diameter, followed by firing at 550° C. This operation was repeated three times to obtain a substrate.

On the other hand, as a pseudo body fluid, an aqueous solution of pH 7.4 composed of 147 mM of $Na^+$, 5 mM of $K^+$, 7.5 mM of $Ca^{2+}$, 1.5 mM of $Mg^{2+}$, 147 mM of $Cl^-$, 4.2 mM of $HCO_3^-$, 15.0 mM of $HPO_4^{2-}$, and 0.5 MM Of $SO_4^{2-}$ was prepared using NaCl, $NaHCO_3$, KCl, $K_2HPO_4.3H_2O$, $MgCl_2.6H_2O$, $CaCl_2$, $Na_2SO_4$, HCl, $(CH_2OH)_3CNH_2$, and distilled water. The substrate was placed in this aqueous solution and left at 60° C. for one day.

The environment-purifying material obtained was observed under an analytical electron microscope, and it was determined hat the surface of the material was covered with island-like apatite hydroxide. 80 environment-purifying materials were placed in a goldfish basin with goldfish swimming therein and left for one month. The surface of the materials did not become slippery and no bacteria or algae were found thereon.

On the contrary, without the environment-purifying material, algae began growing on the surface, rendering it extremely slippery within one week.

[Embodiment 3]

Water and acetic acid were added to titanium tetraisopropoxide to prepare a transparent titanium oxide sol, and the dip coating method was used to coat the sol on granulated porous glass powders approxiamtely 3 mm in diameter, followed by firing at 550° C. This operation was repeated three times to obtain a substrate.

On the other hand, as a pseudo body fluid, an aqueous solution of pH 7.4 composed of 147 mM of $Na^+$, 5 mM of $K^+$, 0.5 mM of $Ca^{2+}$, 1.5 mM of $Mg^{2+}$, 147 mM of $Cl^-$, 4.2 mM of $HCO_3^-$, 1.0 mM of $HP0_4^{2-}$, and 0.5 mM of $SO_4^{2-}$ was prepared using NaCl, $NaHCO_3$, KCl, $K_2HPO_4.3H_2O$, $MgCl_2.6H_2O$, $CaCl_2$, $Na_2SO_4$, HCl, $(CH_2OH)_3CNH_2$, and distilled water. The substrate was placed in this aqueous solution and left at 50° C. for 14 days.

The environment-purifying material obtained was observed under an analytical electron microscope, and it was determined that the surface of the material was covered with porous apatite hydroxide. This environment-purifying material was left in water under the sunlight. The water remained transparent and few bacteria were detected.

On the contrary, without the environment-purifying material, the water became cloudy and bacteria multiplied.

[Embodiment 4]

Titanium oxide produced by the sol-gel method was coated on a 20×75 mm plate glass using the dip coating method, followed by firing at 550° C. This operation was repeated three times to obtain a substrate. On the other hand, as a pseudo-body fluid, an aqueous solution of pH 7.4 composed of 147 mM of $Na^+$, 5 mM of $K^+$, 2.5 mM of $Ca^{2+}$, 1.5 mM of $Mg^{2+}$, 147 mM of $Cl^-$, 4.2 mM of $HCO_3^-$, 3.0 mM of $HPO_4^{2-}$, and 0.5 mM of $SO_4^{2-}$ was prepared using NaCl, $NaHCO_3$, KCl, $K_2HPO^4.3H_2O$, $MgCl_2.6H_2O$, $CaCl_2$, $Na_2SO_4$, HCl, $(CH_2OH)_3CNH_2$, and distilled water. The substrate was placed in this aqueous solution and left at 50° C. for five days.

The environment-purifying material obtained was observed under an analytical electron microscope, and it was determined that the surface of the material was covered with porous apatite hydroxide.

In addition, the antibacterial and antifungal effect of this environment-purifying material was examined as follows. One ml of bacteria liquid of colitis germs cultured on a meat extract bouillon culture medium was dropped onto the environment-purifying material at two points, and a membrane filter was placed on the material, which was then left for cultivation at 37° C. under light from 20-W fluorescent lamps for six hours. A phosphoric acid buffer solution was added to the material, and after shaking, 1 ml of solution was extracted. The number of remaining bacteria was then measured using the pour-plate culture method. The results showed that the bacteria decreased by more than 99%.

[Embodiment 5]Isopropanol and diethanolamine were added to titanium tetraisopropoxide to prepare a transparent sol liquid, and the spray method was used to coat a titanium oxide film on the surface of granular zeolite, which was used as a carrier. The sol liquid was sprayed onto granular zeolite 2 mm in diameter and 3 mm in length (specific surface area: 30 $m^2$/g) while shaking the zeolite on a fine wire gauze, and after drying, the temperature was gradually increased from room temperature up to 620° C. for firing. This operation was repeated four times to obtain a substrate in which the surface of the granular zeolite was covered with the titanium oxide film.

An X-ray diffraction of the crystal structure of the titanium oxide film on the surface of the substrate obtained showed that it consisted of 100% anatase.

On the other hand, as a pseudo-body fluid, an aqueous solution of pH 7.4 composed of 147 mM of $Na^+$, 5 mM of $K^+$, 7.5 mM of $Ca^{2+}$, 1.5 mM of $Mg^{2+}$, 147 mM of $Cl^-$, 4.2 mM of $HCO_3^-$, 1.0 mM of $HPO_4^{2-}$, and 0.5 mM of $SO_4^{2-}$ was prepared using NaCl, $NaHCO_3$, KCl, $K_2HPO_4.3H_2O$, $MgCl_2.6H_2O$, $CaCl_2$, $Na_2SO_4$, HCl, $(CH_2OH)_3CNH_2$, and distilled water. The substrate was placed in this aqueous solution and left at 50° C. for three days.

The environment-purifying material obtained was observed under an analytical electron microscope, and it was determined that the surface of the material was covered with porous apatite hydroxide.

In addition, this environment-purifying material was used to decompose tetrachloroethylene that is commonly used in the advanced-technology or cleaning industry as a solvent or detergent and that poses a problem by contaminating the groundwater or soil. A 18-ml aqueous solution of tetrachloroethylene 10 ppm in concentration was placed in a quartz glass test tube, and 8 g of the environment-purifying material was immersed in the solution, which was then irradiated with light from a 200-W low-voltage mercury lamp. One and a half hours later, the concentration of tetrachloroethylene after reaction was measured using a gas chromatograph. The results showed that the concentration decreased to 0 ppm due to decomposition.

[Embodiment 6]

Ethanol and N-ethyldiethanol amine were added to titanium tetraisopropoxide to prepare a transparent sol liquid, and the dropping method was used to coat a titanium oxide film on the surface of granular activated carbon. A small amount of the sol liquid was dropped onto the surface of the 3 mm diameter granular activated carbon (specific surface area: 250 m$^2$/g), which was treated with a 10% aqueous solution of nitric acid that had been heated up to 80° C. Extra liquid was then removed and the carbon was then dried and heated at 300° C. for firing. This operation was repeated five times to obtain a substrate in which the surface of the granular activated carbon was covered with the titanium oxide film.

An X-ray diffraction of the crystal structure of the titanium oxide film on the surface of the substrate obtained showed that it consisted of a mixture of 80% anatase and 20% rutile.

On the other hand, as a pseudo-body fluid, an aqueous solution of pH 7.4 composed of 147 mM of Na$^+$, 5 mM of K$^+$, 7.5 mM of Ca$^{2+}$, 1.5 mM of Mg$^{2+}$, 147 mM of Cl$^-$, 4.2 mM of HCO$_3^-$, 5.0 mM of HPO$_4^{2-}$, and 0.5 mM of SO$_4^{2-}$ was prepared using NaCl, NaHCO$_3$, KCl, K$_2$HPO$_4$.3H$_2$O, MgCl$_2$.6H$_2$O, CaCl$_2$, Na$_2$SO$_4$, HCl, (CH$_2$OH)$_3$CNH$_2$, and distilled water. The substrate was placed in this aqueous solution and left at 50° C. for three days.

The environment-purifying material obtained was observed under an analytical electron microscope, and it was determined that the surface of the material was covered in scattered fashion with accumulated apatite hydroxide.

In addition, this environment-purifying material was used to decompose acetic acid, which is an offensive-odor substance. A 10-ml aqueous solution of acetic acid 20 ppm in concentration was placed in a container of quartz, and 5 g of the environment-purifying material was immersed in the container. The solution was irradiated with light from a 500-W ultra-high-voltage mercury lamp while being stirred. One hour later, the concentration of acetic acid contained in the reacted liquid was measured using a gas chromatograph. The results showed that the concentration decreased to 0 ppm due to decomposition.

[Embodiment 7]

A titanium oxide film was coated on the surface of sphere-like activated alumina 5 mm in diameter (specific surface area: 80 m$^2$/g) using sputtering. The temperature was then gradually increased from room temperature up to 550° C. for firing to obtain a substrate.

An X-ray diffraction of the crystal structure of the titanium oxide film on the surface of the substrate obtained showed that it consisted of 100% anatase.

In addition, the substrate was immersed in an aqueous solution of ethanol containing 2 g/l of platinum chloride acid potassium, and the solution was irradiated with light from a 100-W mercury lamp (photo-electrodeposition method) while being stirred using a magnetic stirrer, thereby coating the surface of the titanium oxide film with platinum.

On the other hand, as a pseudo-body fluid, an aqueous solution of pH 7.4 composed of 147 mM of Na$^+$, 5 mM of K$^+$, 7.5 mM of Ca$^{2+}$, 1.5 mM of Mg$^{2+}$, 147 mM of Cl$^-$, 4.2 mM of HCO$_3^-$, 5.0 mM of HPO$_4^{2-}$, and 0.5 mM of SO$_4^{2-}$ was prepared using NaCl, NaHCO$_3$, KCl, K$_2$HPO$_4$.3H$_2$O, MgCl$_2$.6H$_2$O, CaCl$_2$, Na$_2$SO$_4$, HCl, (CH$_2$OH)$_3$CNH$_2$, and distilled water. The substrate with platinum coated thereon was placed in this aqueous solution and left at 50° C. for three days to obtain an environment-purifying material.

The environment-purifying material obtained was observed under an analytical electron microscope, and it was determined that the surface of the material was covered with porous apatite hydroxide.

In addition, this environment-purifying material was used to decompose 4-nitrophenylethylphenylphosphinate, an organic-phosphorus agricultural chemical. A 18-ml aqueous solution of 4-nitrophenylethylphenylphosphinate 50 ppm in concentration was placed in a hard-glass test tube, and 1 g of the environment-purifying material was placed in this solution, which was then irradiated with light from a 500-W xenon lamp. One hour later, the concentration of 4-nitrophenylethylphenylphosphinate contained in the reacted liquid was measured using a gas chromatograph. The results showed that the concentration decreased to 0 ppm due to decomposition.

[Embodiment 8]

Water and nitric acid were added to titanium tetraisopropoxide to prepare a transparent titanium oxide sol, and the immersion method was used to coat a titanium oxide film on the surface of a clay sintered compact in order to form a substrate. The clay sintered compact approximately 8 mm in diameter (specific surface area: 10 m$^2$/g was immersed in the titanium oxide sol, and then drawn out before extra liquid was removed from the sintered compact. After drying, the temperature was gradually increased from room temperature up to 650° C. for firing. This operation was repeated three times to obtain the substrate in which the surface of the clay sintered compact was covered with the titanium oxide film.

An X-ray diffraction of the crystal structure of the titanium oxide film on the surface of the substrate obtained showed that it consisted of 100% anatase.

This substrate was immersed in an aqueous solution of copper sulfate, and the temperature was gradually increased from room temperature up to 650° C. for firing. On the other hand, as a pseudo-body fluid, an aqueous solution of pH 7.4 composed of 147 mM of Na$^+$, 5 mM of K$^+$, 7.5 mM of Ca$^{2+}$, 1.5 mM of Mg$^{2+}$, 147 mM of Cl$^-$, 4.2 mM of HCO$_3^-$, 1.0 mM of HPO$_4^{2-}$, and 0.5 mM of SO$_4^{2-}$ was prepared using NaCl, NaHCO$_3$, KCl, K$_2$HPO$_4$.3H$_2$O, MgCl$_2$.6H$_2$O, CaCl$_2$, Na$_2$SO$_4$, HCl, (CH$_2$OH)$_3$CNH$_2$, and distilled water. The substrate was placed in this aqueous solution and left at 50° C. for three days.

The environment-purifying material particles obtained were observed under an analytical electron microscope , and it was determined that that the surface of the material was covered with porous apatite hydroxide.

In addition, this environment-purifying material was used to decolor dyeing wastewater. A 3-ml aqueous solution of methyl orange was placed in a quartz cell as model wastewater, and 2 g of the environment-purifying material was placed in the solution. The solution was then

[Embodiment 9]

A titanium oxide film was coated on the surface of foaming aluminum (diameter: approximately 7 mm) (specific surface area: 8 m$^2$/g) using PVD. The temperature was then gradually increased from room temperature up to 600° C. for firing to obtain a substrate.

An X-ray diffraction of the crystal structure of the titanium oxide film on the surface of the substrate obtained showed that it consisted of 100% anatase.

On the other hand, as a pseudo-body fluid, an aqueous solution of pH 7.4 composed of 147 mM of Na$^+$, 5 mM of K$^+$, 7.5 mM of Ca$^{2+}$, 1.5 mM of Mg$^{2+}$, 147 mM of Cl$^-$, 4.2 mM of HCO$_3^-$, 1.0 mM of HPO$_4^{2-}$, and 0.5 mM of SO$_4^{2-}$ was prepared using NaCl, NaHCO$_3$, KCl, K$_2$HPO$_4$.3H$_2$O, MgCl$_2$.6H$_2$O, CaCl$_2$, Na$_2$SO$_4$, HCl, (CH$_2$OH)$_3$CNH$_2$, and distilled water. The substrate was placed in this aqueous solution and left at 50° C. for three days.

The environment-purifying material particles obtained were observed under an analytical electron microscope, and it was determined that the surface of the material was covered with porous apatite hydroxide.

In addition, this environment-purifying material was used to decompose ethanol. A 15-ml aqueous solution of ethanol 300 ppm in concentration was placed in a hard glass test tube, and 2 g of the environment-purifying material was placed in this solution, which was then irradiated with light from a 500-W xenon lamp. One hour later, the concentration of ethanol contained in the reacted liquid was measured using a gas chromatograph. The results showed that the concentration decreased to 0 ppm.

[Embodiment 10]

Ethanol and triethanl amine were added to titanium tetraisopropoxide to prepare a transparent sol liquid, and the immersion method was used to coat a titanium oxide film on the surface of a porous glass to obtain a substrate. Porous glass approximately 8 mm in diameter (specific surface area: 150 m$^2$/g) was immersed in the sol liquid, and extra liquid was removed from the glass. After drying, the temperature was gradually increased from room temperature up to 550° C. for firing. This operation was repeated four times to obtain the substrate in which the surface of the porous glass was covered with the titanium oxide film.

An X-ray diffraction of the crystal structure of the titanium oxide film on the surface of the substrate obtained showed that it consisted of 100% anatase.

On the other hand, as a pseudo-body fluid, an aqueous solution of pH 7.4 composed of 147 mM of Na$^+$, 5 mM of K$^+$, 5.5 mM of Ca$^{2+}$, 1.5 mM of Mg$^{2+}$, 147 mM of Cl$^-$, 4.2 mM of HCO$_3^-$, 1.0 mM of HPO$_4^{2-}$, and 0.5 mM of SO$_4^{2-}$ was prepared using NaCl, NaHCO$_3$, KCl, K$_2$HPO$_4$.3H$_2$O, MgCl$_2$.6H$_2$O, CaCl$_2$, Na$_2$SO$_4$, HCl, (CH$_2$OH)$_3$CNH$_2$, and distilled water. The substrate was placed in this aqueous solution and left at 50° C. for three days.

The environment-purifying material obtained was observed under an analytical electron microscope, and it was determined that the surface of the material was covered in scattered fashion with accumulated apatite hydroxide. This environment-purifying material was used to decompose tetrachloroethane that is commonly used in the advanced-technology or cleaning industry as a solvent or detergent and that poses a problem by contaminating groundwater or soil. A 3-ml aqueous solution of tetrachloroethane 15 ppm in concentration was placed in a quartz cell, and 3 g of the environment-purifying material was immersed in the solution, which was then irradiated with light from five 15-W black lights. Three hours later, the concentration of tetrachloroetane contained in the reacted liquid was measured using a gas chromatograph. The results showed that the concentration decreased to 0 ppm due to decomposition.

[Embodiment 11]

Ethanol and diethanolamine were added to titanium tetraisopropoxide to prepare a transparent sol liquid, and the dip coating method was used to coat a titanium oxide film on the surface of foam ceramics to form a substrate. Foam ceramics 2 cm in diameter and 5 cm in length (specific surface area: 5 m$^2$/g) were immersed in the sol liquid and then drawn out slowly. The temperature was then gradually increased from room temperature up to 650° C. for firing to form the substrate.

An X-ray diffraction of the crystal structure of the titanium oxide film on the surface of the substrate obtained showed that it consisted of 100% anatase.

On the other hand, as a pseudo-body fluid, an aqueous solution of pH 7.4 composed of 147 mM of Na$^+$, 5 mM of K$^+$, 7.5 mM of Ca$^{2+}$, 1.5 mM of Mg$^{2+}$, 147 mM of Cl$^-$, 4.2 mM of HCO$_3^-$, 1.0 mM of HPO$_4^{2-}$, and 0.5 mM of SO$_4^{2-}$ was prepared using NaCl, NaHCO$_3$, KCl, K$_2$HPO$_4$.3H$_2$O, MgCl$_2$.6H$_2$O, CaCl$_2$, Na$_2$SO$_4$, HCl, (CH$_2$OH)$_3$CNH$_2$, and distilled water. The substrate was placed in this aqueous solution and left at 50° C. for five days.

The environment-purifying material obtained was observed under an analytical electron microscope, and it was determined that the surface of the material was covered in scattered fashion with accumulated apatite hydroxide.

In addition, this environment-purifying material was used to decompose palathion, an organic-phosphorus agricultural chemical. A 50-ml aqueous solution of parathion 10 ppm in concentration was placed in a hard glass beaker, and 2 g of the environment-purifying material was placed in this solution, which was then irradiated with light from three 200-W high-voltage mercury lamps from three directions. Two hours later, the concentration of parathion contained in the reacted liquid was measured using a gas chromatograph. The results showed that the concentration decreased to 0 ppm due to decomposition.

[Embodiment 12]

As a pseudo-body fluid, an aqueous solution of pH 7.4 composed of 142 mM of Na$^+$, 5 mM of K$^+$, 2.5 mM of Ca$^{2+}$, 1.5 mM of Mg$^{2+}$, 147.8 mM of Cl$^-$, 4.2 mM of HCO$_3^-$, 1 mM of HPO$_4^{2-}$, and 0.5 mM of SO$_4^{2-}$ was prepared using NaCl, NaHCO$_3$, KCl, K$_2$HPO$_4$.3H$_2$O, MgCl$_2$.6H$_2$O, CaCl$_2$, Na$_2$SO$_2$, HCl, (CH$_2$OH)$_3$CNH$_2$, and distilled water. 0.5 g of anatase-type titanium oxide particles of 1 μm particle size were added to 20 ml of this aqueous solution as a pseudo-body fluid, and were then dispersed using supersonic waves. The solution was then left at 60° C. for 24 hours to obtain an environment-purifying material.

The environment-purifying material obtained was observed under an analytical electron microscope, and it was determined that the surface of the material was covered with apatite hydroxide grains.

This environment-purifying material was mixed into nylon (trade name), which was then molded into a sheet to examine its effects in decomposing and removing stains caused by cigarette smokes. Cigarette smoke was blown onto the sheet to change its color to brown, and the sheet was then exposed to sunlight for 24 hours. As a result, the stains were decomposed and removed, restoring the sheet to the original color as in the direct mixture into nylon of anatase-type titanium oxide particles (substrate) the surface of which was not covered with apatite oxide. This experiment was repeated, clarifying that the sheet including the environment-purifying material had a 15-times longer lifetime expectancy than the nylon sheet with anatase-type titanium oxide directly mixed therein that was immediately degraded.

[Embodiment 13]

As a pseudo-body fluid, an aqueous solution of pH 7.4 composed of 142 mM of Na$^+$, 5 mM of K$^+$, 50 mM of Ca$^{2+}$, 1.5 mM of Mg$^{2+}$, 147.8 mM of Cl$^-$, 4.2 mM of HCO$_3^-$, 8 mM of HPO$_4^{2-}$, and 0.5 mM of SO$_4^{2-}$ was prepared using NaCl, NaHCO$_3$, KCl, K$_2$HPO$_4$.3H$_2$O, MgCl$_2$.6H$_2$O, CaCl$_2$, Na$_2$SO$_4$, HCl, (CH$_2$OH)$_3$CNH$_2$ and distilled water. 5 g of 70%-anatase/30%-rutile-type titanium oxide particles of 40 nm particle size were added as a substrate to 20 ml of this aqueous solution as a pseudo-body fluid, and then dispersed using supersonic waves. The solution was then left at 60° C. for 24 hours to obtain an environment-purifying material.

The environment-purifying material particles obtained were observed under an analytical electron microscope, and it was determined that the surface of the material was covered with apatite hydroxide grains.

This environment-purifying material was mixed into polyester, which was spun into fibers to examine its deodorization effect. A polyester sheet 10 by 10 centimeters square, formed of these fibers was placed into a sealed container of 36 l content volume, and 100-ppm acetoaldehyde was introduced into the container using a syringe. The container was then irradiated with light from a 300-W xenon lamp having a wavelength distribution similar to that of the sunlight. Six hours later, the concentration of acetoaldehyde contained in the sealed container was examined using a gas chromatograph. The results showed that the concentration decreased to 1 ppm, so the same deodorization effect was obtained as in the direct mixture into polyester of anatase-type titanium oxide in which its surface was not covered with apatite hydroxide. In addition, to examine durability, this experiment was repeated, clarifying that the polyester sheet including the environment-purifying material had a 20-times longer lifetime expectancy than the polyester sheet with anatase-type titanium oxide directly mixed therein that was immediately degraded.

[Embodiment 14]

As a pseudo-body fluid, an aqueous solution of pH 7.4 composed of 160 mM of $Na^+$, 20 mM of $K^+$, 50 mM of $Ca^{2+}$, 50 mM of $Mg^{2+}$, 200 mM of $Cl^-$, 30 mM of $HCO_3^-$, 20 mM of $HPO_4^{2-}$, and 20 mM of $SO_4^{2-}$ was prepared using NaCl, $NaHCO_3$, KCl, $K_2HPO_4.3H_2O$, $MgCl_2.6H_2O$, $CaCl_2$, $Na_2SO_4$, HCl, $(CH_2OH)_3CNH_2$, and distilled water. 5 g of anatase-type titanium oxide particles of 800 nm particle size carrying platinum were added to 20 ml of this aqueous solution as a pseudo-body fluid, and were then dispersed using supersonic waves. The solution was then left at 60° C. for eight hours.

The environment-purifying material particles obtained were observed under an analytical electron microscope, and it was determined that the surface of the material was covered with fine apatite hydroxide grains.

This environment-purifying material was mixed into polycarbonate, which was molded into a water vessel. The water vessel was used to decompose and remove trihalomethane and chlorine odor from city water. The decomposition and removal effect obtained was nearly the same as in the direct mixture into polycarbonate of titanium oxide without coating. The polycarbonate into which titanium oxide was directly melted without coating was degraded and became cloudy, whereas the mixture with the environment-purifying material had about a 10-times longer lifetime expectancy.

[Embodiment 15]

As a pseudo-body fluid, an aqueous solution of pH 7.4 composed of 120 mM of $Na^+$, 1 mM of $K^+$, 1.5 mM of $Ca^{2+}$, 0.5 mM of $Mg^{2+}$, 80 mM of $Cl^-$, 0.5 mM of $HCO_3^-$, 2 mM of $HPO_4^{2-}$, and 0.1 mM of $SO_4^{2-}$ was prepared using NaCl, $NaHCO_3$, KCl, $K_2HPO_4.3H_2O$, $MgCl_2.6H_2O$, $CaCl_2$, $Na_2SO_4$, HCl, $(CH_2OH)_3CNH_2$, and distilled water. Five grams of anatase-type titanium oxide particles of 500 nm particle size were added to 200 ml of this aqueous solution as a pseudo-body fluid, and were then dispersed using supersonic waves. The solution was then left at 35° C. for three weeks.

The environment-purifying material particles obtained were observed under an analytical electron microscope, and it was determined that that the surface of the material was covered with apatite hydroxide and carbonate grains. This environment-purifying material was mixed into polypropyrene, which was spun into fibers to examine its deodorization effect. As in Embodiment 13, a sheet 10 by 10 cm 2 formed of these fibers was placed into a sealed container, and 40-ppm iso-valeric acid was introduced into the container using a syringe. Six hours later, the concentration of iso-valeric acid was examined using a gas chromatograph. The results showed that the concentration decreased to less than 1 ppm, so the same deodorization effect was obtained as in the direct mixture into polypropyrene of anatase-type titanium oxide. In addition, to examine durability, this experiment was repeated , and it was determined that that this sheet had a 12-times longer lifetime expectancy than the sheet with anatase-type titanium oxide directly mixed therein.

[Embodiment 16]

As a pseudo-body fluid, an aqueous solution of pH 7.4 composed of 147 mM of $Na^+$, 5 mM of $K^+$, 7.5 mM of $Ca^{2+}$, 1.5 mM of $Mg^{2+}$, 147 mM of $Cl^-$, 4.2 mM of $HCO_3^-$, 1.0 mM of $HPO_4^{2-}$, and 0.5 mM of $SO_4^{2-}$ was prepared using NaCl, $NaHCO_3$, KCl, $K_2HPO_4.3H_2O$, $MgCl_2.6H_2O$, $CaCl_2$, $Na_2SO_4$, HCl, $(CH_2OH)_3CNH_2$, and distilled water. 59 of anatase-type titanium oxide particles of 700 nm particle size carrying silver were added to 200 ml of this aqueous solution as a pseudo-body fluid, and were then dispersed using supersonic waves. The solution was then left at 35° C. for three weeks. The environment-purifying material particles obtained were observed under an analytical electron microscope, and it was determined that that the surface of the material was covered with a mixture of apatite hydroxide and carbonate grains.

This environment-purifying material was mixed into polyethylene, which was molded into a sheet to examine its antibacterial and funginert effect. bacteria collected from a food processor were cultured on a meat extract bouillon culture medium, and 1 ml of bacteria liquid obtained was dropped onto the sheet at two points. A membrane filter was placed on the sheet, which was then left for cultivation at 37° C. under light from 20-W fluorescent lamps for six hours. A phosphoric acid buffer solution was added to the sheet, and after shaking, 1 ml of solution was extracted. Then, the number of remaining bacteria was measured using the pour-plate culture method. The results showed that the bacteria decreased by more than 99%, so the same antibacterial and antifungal effect was obtained as in the mixture into the sheet of anatase-type titanium oxide carrying silver. In addition, to examine durability, this experiment was repeated, and it was determined that that this sheet had a 15-times longer lifetime expectancy than the sheet into which anatase-type titanium oxide carrying silver was directly mixed.

[Embodiment 17]

As a pseudo-body fluid, an aqueous solution of pH 7.4 composed of 147 mM of $Na^+$, 5 mM of $K^+$, 7.5 mM of $Ca^{2+}$, 1.5 mM of $Mg^{2+}$, 147 mM of $Cl^-$, 4.2 mM of $HCO_3^-$, 5 mM of $HPO_4^{2-}$, and 0.5 mM of $SO_4^{2-}$ was prepared using NaCl, $NaHCO_3$, KCl, $K_2HPO_4.3H_2O$, $MgCl_2.6H_2O$, $CaCl_2$, $Na_2SO_4$, HCl, $(CH_2OH)_3CNH_2$, and distilled water. 5 g of anatase-type titanium oxide particles of 500 nm particle size were added to 200 ml of this aqueous solution as a pseudo-body fluid, and were then dispersed using supersonic waves. The solution was then left at 50° C. for three days.

The environment-purifying material particles obtained were observed under an analytical electron microscope, and it was determined that that the surface of the material was covered with a mixture of apatite hydroxide and carbonate grains.

This environment-purifying material was mixed into silicon resin, which was molded into a sheet to examine its NOx removal effect. As in Embodiment 13, the sheet 10 by 10 $cm^2$ was placed into a sealed container, and 5-ppm NOx was introduced into the container using a syringe. Six hours later, the concentration of NOx was examined using a gas chromatograph. The results showed that the concentration decreased to nearly zero, so the same NOx removal effect was obtained as in the direct mixture into silicon resin of anatase-type titanium oxide. In addition, to examine durability, this experiment was repeated, and it was determined that that this sheet had a 10-times longer lifetime expectancy than the sheet with anatase-type titanium oxide directly mixed therein.

[Embodiment 18]

As a pseudo-body fluid, an aqueous solution of pH 7.4 composed of 142 mM of $Na^+$, 5 mM of $K^+$, 5.5 mM of $Ca^{2+}$, 1.5 mM of $Mg^{2+}$, 147 mM of $Cl^-$, 4.2 mM of $HCO_3^-$, 8 mM of $HPO_4^{2-}$, and 0.5 mM of $SO_4^{2-}$ was prepared using NaCl, $NaHCO_3$, KCl, $K_2HPO_4.3H_2O$, $MgCl_2.6H_2O$, $CaCl_2$, $Na_2SO_4$, HCl, $(CH_2OH)_3CNH_2$, and distilled water. 5 g of anatase-type titanium oxide particles of 1.2 μm particle size were added to 200 ml of this aqueous solution as a pseudo body fluid, and were then dispersed using supersonic waves. The solution was then left at about 70° C. for 12 hours.

The environment-purifying material particles obtained were observed under an analytical electron microscope, and it was determined that that the surface of the material was covered with a mixture of apatite hydroxide and carbonate grains.

This environment-purifying material was mixed into fluorine resin, which was molded into a sheet to examine its effect in removing SOx from the air. As in Embodiment 13, the sheet 10 by 10 cm 2 was placed into a sealed container, and 5-ppm SOx was introduced into the container using a syringe. Six hours later, the concentration of SOx was examined using a gas chromatograph. The results showed that the concentration decreased to nearly zero, so the same SOx removal effect was obtained as in the direct mixture into the resin of anatase-type titanium oxide. In addition, to examine durability, this experiment was repeated, and it was determined that that this sheet had a eight-times longer lifetime expectancy than the sheet with anatase-type titanium oxide directly mixed therein.

[Embodiment 19]

Absolute ethanol and triethanol amine were added to titanium tetraisopropoxide to prepare a transparent sol liquid, and the dropping method was used to coat a titanium oxide film on the surface of a spherical silica gel to form a substrate. A small amount of the sol liquid was dropped onto the surface of the 5-mm diameter spherical silica gel (specific surface area: 450 $m^2/g$), and extra liquid was then removed. After drying, the temperature was gradually increased from the room temperature up to 600° C. for firing. This operation was repeated three times to obtain a substrate in which the surface of the spherical silica gel was covered with the titanium oxide film.

An X-ray diffraction of the crystal structure of the titanium oxide film on the surface of the substrate obtained showed that it consisted of 100% anatase.

On the other hand, as a pseudo-body fluid, an aqueous solution of pH 7.4 composed of 147 mM of $Na^+$, 5 mM of $K^+$, 7.5 mM of $Ca^{2+}$, 1.5 mM of $Mg^{2+}$, 147 mM of $Cl^-$, 4.2 mM of $HCO_3^-$, 1.0 mM of $HPO_4^{2-}$, and 0.5 mM of $SO_4^{2-}$ was prepared using NaCl, $NaHCO_3$, KCl, $K_2HPO_4.3H_2O$, $MgCl_2.6H_2O$, $CaCl_2$, $Na_2SO_4$, HCl, $(CH_2OH)_3CNH_2$, and distilled water. The substrate was placed in this aqueous solution and left at 50° C. for three days.

The environment-purifying material obtained was observed under an analytical electron microscope, and it was determined that the surface of the material was covered with a mixture of porous apatite hydroxide and carbonate.

The antibacterial and funginert effect of the environment-purifying material was examined using a similar method to Embodiment 13. The results showed that more than 99% of the bacteria has been killed, so this material provided a five-times greater antibacterial and funginert effect than the one with only a titanium oxide film formed thereon.

[Embodiment 20]

Absolute ethanol, triethanol amine, and water were added to titanium tetraisopropoxide to prepare a transparent sol liquid, and the dropping method was used to coat a titanium oxide film on the surface of a spherical silica gel to form a substrate. A small amount of the sol liquid was dropped onto the surface of the 5-mm diameter spherical silica gel (specific surface area: 450 $m^2/g$), and extra liquid was then removed. After drying, the temperature was gradually increased from room temperature up to 600° C. for firing. This operation was repeated three times to obtain the substrate in which the surface of the spherical silica gel was covered with the titanium oxide film.

An X-ray diffraction of the crystal structure of the titanium oxide film on the surface of the substrate obtained showed that it consisted of 100% anatase.

On the other hand, as a pseudo-body fluid, an aqueous solution of pH 7.4 composed of 147 mM of $Na^+$, 5 mM of $K^+$, 7.5 mM of $Ca^{2+}$, 1.5 mM of $Mg^{2+}$, 147 mM of $Cl^-$, 4.2 mM of $HCO_3^-$, 1.0 mM of $HPO_4^{2-}$, and 0.5 mM of $SO_4^{2-}$ was prepared using NaCl, $NaHCO_3$, KCl, $K_2HPO_4.3H_2O$, $MgCl_2.6H_2O$, $CaCl_2$, $Na_2SO_2$, HCl, $(CH_2OH)_3CNH_2$, and distilled water. The substrate was placed in this aqueous solution and left at 50° C. for three days.

The environment-purifying material obtained was observed under an analytical electron microscope, and it was determined that the surface of the material was covered with a mixture of porous apatite hydroxide and carbonate.

In addition, the antibacterial and antifungal effect of the environment-purifying material was examined using a similar method to Embodiment 13. The results showed that more than 99% of the bacteria has been killed, so this material provided a five-times greater antibacterial and funginert effect than the one with only a titanium oxide film formed thereon.

[Embodiment 21]

As a pseudo-body fluid, an aqueous solution of pH 7.4 composed of 147 mM of $Na^+$, 5 mM of $K^+$, 7.5 mM of $Ca^{2+}$, 147 mM of $Cl^-$, 15 mM of $HPO_4^{2-}$, and 5 mM of $F^-$ was prepared using NaCl, $NaHCO_3$, KCl, $K_2HPO_4.3H_2O$, $CaCl_2$, NaF, and distilled water. The substrate was placed in this aqueous solution and left at 40° C. for one day.

The environment-purifying material obtained was observed under a scanning electron microscope, and it was determined that the surface of the material was covered in a scattered fashion with an island-like fluorine apatite. This material was placed in a goldfish basin with goldfish living therein and left for one month. The surface of the material did not become slimy and no bacteria or algae were found thereon.

On the contrary, without the environment-purifying material, algae stated to grow on the surface of the material, rendering it slimy within one week.

According to the environment-purifying material of this invention, the calcium phosphate film covering the surface of the substrate is porous so that the titanium oxide on the surface is irradiated with light through the pores, so nearly the same photocatalyst effect can be obtained as in materials that are not covered with the calcium phosphate film. In addition, since the calcium phosphate film adsorbs contaminants such as bacteria, the adsorbed contaminants can be reliably and effectively decomposed and removed using the photocatalyst effect.

Accordingly, the present material is extremely effective in purifying environments, e.g., decomposing and removing offensive odors or toxic substances such as cigarette smoke, NOx, or Sox in the air, decomposing and removing organic compounds such as organic solvents or agricultural chemicals that are dissolved in water, treating or purifying wastewater, preventing stains, eliminating bacteria and fungus, or preventing nosocomial infection such as MRSA. Furthermore, titanium oxide is used in paints, cosmetics, or tooth powder and is an authorized food additive. Thus, this substance is non-toxic, safe, inexpensive, weather-resistant, and durable, qualities that combine to make the substance extremely economical and practical.

In addition, the calcium phosphate film is inactive as a photocatalyst, so even if the purifying material were added to a medium such as organic fibers or plastics by means of mixing, it does not degrade the medium but can retain its purifying effect. Thus, when added to the medium such as organic fibers or plastics, the environment-purifying material according to this invention can be used for various applications such as the deodorization of a car room, a living room, a kitchen, or a toilet; wastewater treatment, the purification of a pool or stored water; the prevention of the multiplication of bacteria or fungus, or the prevention of the putrefaction of foods. In addition, this invention does not require toxic substances such as chemicals or ozone but can be inexpensively and safely used over extended periods of time without the need for high energy or maintenance, as it simply requires irradiation with electric or natural light.

Furthermore, the environment-purifying material according to this invention can be manufactured simply by placing a substrate in a pseudo-body fluid and leaving the substrate as it is. It also enables the diameter of the pores in its surface and their distribution density to be controlled by varying the composition or temperature of the pseudo-body fluid or the relevant times.

What is claimed is:

1. An environment-purifying material wherein a porous apatite film is coated on the surface of a particulate substrate, the surface comprising titanium oxide.

2. An environment-purifying material according to claim 1, said substrate comprises a carrier wherein the surface of said carrier is coated with a titanium oxide film having an anatase crystal form.

3. An environment-purifying material according to claim 2 wherein said carrier is selected from activated carbon, activated alumina, silica gel, zeolite, clay sintered compact, glass, foam ceramics, foam metal, and foam plastics.

4. An environment-purifying material according to claim 1 wherein said substrate is titanium oxide particles.

5. An environment-purifying material according to claim 1 or 4 wherein the crystal form of said titanium oxide is anatase.

6. An environment-purifying material according to claim 1, wherein said porous apatite is selected from the group consisting of apatite hydroxide, apatite carbonate, and fluorine apatite.

7. An environment-purifying material according to claim 1 wherein metal is carried on the surface of titanium oxide.

8. An environment-purifying material according to claim 7 wherein said metal is selected from platinum, rhodium, ruthenium, palladium, silver, copper, and zinc.

9. An environment-purifying composition comprising a plastic mixed with the environment-purifying material of claim 1, wherein said environment-purifying material does not degrade said organic fiber or said plastic.

10. The environment-purifying composition of claim 9, wherein said plastic is at least one material selected from the group consisting of polyethylene, nylon, polyvinyl chloride, polyvinylidene chloride, polyester, polypropylene, polyethylene oxide, polyethylene glycol, polyethylene terephthalate, silicon resin, polyvinyl alcohol, vinyl acetal resin, polyacetate, ABS resin, epoxy resin, vinyl acetate resin, cellulose, cellulose derivative, polyamide, polyurethane, polycarbonate, polystyrene, urea resin, fluorine containing resin, polyvinylidene, phenol resin, celluloid, chitin, starch sheet, and copolymers and mixtures thereof.

11. An environment-purifying material of claim 1, wherein said particulate substrate has a particle size of from 40 nm to 1 cm.

12. An environment-purifying material of claim 1, wherein said particulate substrate has a particle size of from 40 nm to 1.2 $\mu$m.

13. An environment-purifying material of claim 1, wherein said particulate substrate has a particle size of from 2 mm to 1 cm.

14. An environment-purifying material, comprising a substrate coated with a porous apatite film, wherein said substrate comprises a carrier having a surface coated with an anatase titanium oxide film.

15. An environment-purifying material manufacturing method wherein a porous calcium phosphate film is coated on the surface of a substrate having a surface comprising titanium oxide by immersing said particulate substrate in a pseudo-body fluid containing calcium phosphate.

16. A manufacturing method according to claim 15 wherein said pseudo-body fluid contains at least 0.5 to 50 mM of $Ca^{2+}$ and 1 to 20 mM of $HPO_4^2$.

17. A manufacturing method according to claim 15 wherein said pseudo-body fluid has the following composition ratio:

$Na^+$ 120 to 160 mM
$K^+$ 1 to 20 mM
$Ca^{2+}$ 0.5 to 50 mM
$Mg^{2+}$ 0.5 to 50 mM
$Cl^-$ 80 to 200 mM
$HCO_3^-$ 0.5 to 30 mM
$HPO_4^{2-}$ 1 to 20 mM
$SO_4^{2-}$ 0.1 to 20 mM
$F^-$ 0 to 5 mM.

18. A manufacturing method according to claim 15 wherein said pseudo-body fluid has a pH of 7 to 8.

19. A manufacturing method according to claim 15, wherein the pseudo-body fluid in which said substrate is immersed has a temperature of 30° C. to 100° C.

20. A manufacturing method according to claim 15 wherein, after immersion in the pseudo-body fluid, said substrate is dried at 40° C. to 600° C.

21. A manufacturing method according to claim 15 wherein said substrate comprises titanium oxide particles.

22. A manufacturing method according to claim 15 wherein said substrate comprises a carrier selected from activated carbon, activated alumina, silica gel, zeolite, clay sintered compact, glass, foam ceramics, foam metal, and foam plastics, the surface of which is coated with a titanium oxide film.

* * * * *